(12) United States Patent
Reintjens et al.

(10) Patent No.: US 10,118,149 B2
(45) Date of Patent: Nov. 6, 2018

(54) OSCILLATING FLOW MINIREACTOR

(75) Inventors: Rafael Wilhelmus Elisabeth Ghislain Reintjens, Maaseik (BE); Mehul Thathagar, Geleen (NL)

(73) Assignee: Patheon Austria GmbH & Co KG, Linz (AT)

( * ) Notice: Subject to any disclaimer, the term of this patent is extended or adjusted under 35 U.S.C. 154(b) by 1134 days.

(21) Appl. No.: 13/979,719

(22) PCT Filed: Jan. 13, 2011

(86) PCT No.: PCT/EP2011/050386
§ 371 (c)(1),
(2), (4) Date: Dec. 2, 2013

(87) PCT Pub. No.: WO2012/095176
PCT Pub. Date: Jul. 19, 2012

(65) Prior Publication Data
US 2014/0081038 A1  Mar. 20, 2014

(51) Int. Cl.
*B01J 19/24* (2006.01)
*B01F 5/06* (2006.01)
(Continued)

(52) U.S. Cl.
CPC ........... *B01J 19/243* (2013.01); *B01F 5/0647* (2013.01); *B01F 11/0071* (2013.01); *B01F 13/0059* (2013.01); *B01J 19/0093* (2013.01); *B01F 2215/0431* (2013.01); *B01J 2219/00013* (2013.01); *B01J 2219/0086* (2013.01); *B01J 2219/00783* (2013.01); *B01J 2219/00873* (2013.01); *B01J 2219/00889* (2013.01);
(Continued)

(58) Field of Classification Search
CPC . B01J 19/243; B01J 10/00; B01J 12/00; B01J 14/00; B01J 15/00; B01J 16/00; B01J 19/00; B01J 8/00
USPC ........................................................ 422/129
See application file for complete search history.

(56) References Cited

U.S. PATENT DOCUMENTS 4,271,007 A * 6/1981 Souhrada ............. B01J 19/0026
137/13
6,429,268 B1  8/2002 Xiongwei
(Continued)

FOREIGN PATENT DOCUMENTS

WO  02/068112  9/2002
WO  2002/068112 A1  9/2002
(Continued)

OTHER PUBLICATIONS

Office Action for CN-201180064961.3, dated Jun. 23, 2014, 12 pages.
(Continued)

*Primary Examiner* — Huy Tram Nguyen
(74) *Attorney, Agent, or Firm* — Pierce Atwood LLP; Raymond G. Arner

(57) ABSTRACT

The present invention relates to an apparatus comprising a) an unbaffled reactor or microreactor having a channel defined by a pathway, and b) an oscillating flow device, wherein the channel pathway comprises a plurality of directional changes. The reactor channel has a hydrolic diameter from 0.1 mm to 10 mm. A method of making said apparatus and the use of said apparatus to carry out a process on a suspension is also disclosed.

11 Claims, 2 Drawing Sheets

Figure 1:
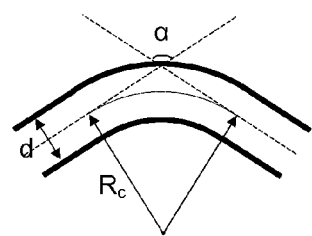

(51) Int. Cl.
  *B01F 11/00* (2006.01)
  *B01F 13/00* (2006.01)
  *B01J 19/00* (2006.01)
(52) U.S. Cl.
  CPC ............... *B01J 2219/00891* (2013.01); *Y10T 29/49826* (2015.01)

(56) References Cited

U.S. PATENT DOCUMENTS

| | | | |
|---|---|---|---|
| 2001/0052460 A1* | 12/2001 | Chien | B01L 3/502715 204/450 |
| 2005/0016851 A1* | 1/2005 | Jensen | B01F 5/0646 204/471 |
| 2005/0272144 A1* | 12/2005 | Sando | B01F 5/0475 435/287.2 |
| 2006/0034735 A1 | 2/2006 | Miura et al. | |
| 2006/0034765 A1 | 2/2006 | Schmainda et al. | |
| 2006/0283798 A1* | 12/2006 | Ueki | B01D 11/0203 210/634 |
| 2008/0274038 A1* | 11/2008 | Sakata | B01J 19/0093 423/493 |
| 2008/0316858 A1* | 12/2008 | Gron | B01F 5/061 366/341 |
| 2009/0107030 A1 | 4/2009 | Tabata et al. | |

FOREIGN PATENT DOCUMENTS

| | | |
|---|---|---|
| WO | 2002/0698112 A1 | 9/2002 |
| WO | 2006/030952 A1 | 3/2006 |
| WO | WO 2006/030952 | 3/2006 |

OTHER PUBLICATIONS

Office Action for CN-201180064961.3, dated Feb. 12, 2015, 7 pages.
Office Action for CN-201180064961.3, dated Aug. 20, 2015, 7 pages.
International Preliminary Report on Patentability for PCT/EP2011/050386, dated Jul. 25, 2013, 10 pages.
Hiessel, V., et al., "Mikroverfahrenstechnik: Komponenten—Anlagenkonzeption—Anwenderakzeptanz—Teil 1", Chemie Ingenieur Technik, 2002, pp. 17-30, vol. 74. (Abstract only—translated).
Lobbecke S., et al., "The Potential of Microreactors for the Synthesis of Energetic Materials", Chemie Ingenieur Technik, 2004, 16 pages, vol. 76, Issue No. 09.
Dean, et al., "Note on the Motion of Fluid in a Curved Pipe", London, Edinburgh, and Dublin Philosophical Magazine and Journal of Science: Series 7, 4:20, pp. 208-223, 1927.
Pieters, B. et al., "The Impact of Microtechnologies on Chemical and Pharmaceutical Production Processes", Chemical Engineering & Technology, Special Issue: Micro Process Technology, DOI: 10.1002/ceat.200600315, Jan. 3, 2007, pp. 407-409, vol. 30, Issue No. 03.
Roberge, D.,M., et al., "Microreactor Technology: A Revolution for the Fine Chemical and Pharmaceutical Industries?", Chemical Engineering & Technology, Special Issue: Microreactor Process Design (part 1), DOI: 10.1002/ceat.200407128, Mar. 7, 2005, pp. 318-323,vol. 28, Issue No. 03.
Wirth, Thomas, "Microreactors in Organic Chemistry and Catalysis", Second, Completely Revised and Enlarged Edition, Wiley-VCH, ISBN: 978-3-527-31869-8, pp. 1-8, 2008.
Zimmels, Yoram, "Sedimentation", Ullmann's Encyclopedia of Industrial Chemistry, DOI: 10.1002/14356007.b02_12, pp. 277-341, Jun. 15, 2000.
European Patent Office Communication dated Mar. 20, 2017 from corresponding European Patent Application No. 11 700 174.3.
Goullet et al. "Effects of microchannel geometry on pulsed flow mixing." Mechanics Research Communications, vol. 33, No. 5, Feb. 28, 2006, pp. 739-746.
Zheng et al., "The axial dispersion performance of an oscillatory flow mesoreactor with relevance to continuous flow operation." Chemical Engineering Science, Oxford, GB, vol. 63, No. 7, Dec. 17, 2007, pp. 1788-1799.
Chinese Office Action for corresponding Chinese Patent Application No. 201180064961.3, dated Mar. 4, 2016, 8 pages.
Chinese Office Action for corresponding Chinese Patent Application No. 201180064961.3, dated Aug. 29, 2016, 11 pages.
International Search Report and Written Opinion for corresponding PCT Application No. PCT/EP2011/050386, dated Oct. 25, 2011, 17 pages.
Qi et al., "Modelling Laminar Pulsed Flow in Rectangular Microchannels," Chemical Engineering Science, 63 (2008) pp. 2682-2689.
Response to European Communication for corresponding European Patent Application No. 11700174.3, dated Jul. 18, 2017, 2 pages.
Ni et al., "Mixing through Oscillations and Pulsations—A Guide to Achieving Process Enhancements in the Chemical and Process Industries," Trans IChemE., vol. 81 Part A, 2003, pp. 373-383.
A. Pfenning, RWTH Aachen University, Germany, "Liquid-Liquid Extraction," Ullmann Encyclopedia of Ind. Chem., DOI 10.1002/14356007.b03_06 Wiley-VCH Verlag GmbH & Co KGaA, Weinheim (2005), 54 pages.
International Search Report for PCT/EP2011/050386, dated Oct. 25, 2011.
Written Opinion for PCT/EP2011/050386, dated Oct. 25, 2011.
Goullet et al., "Effects of microchannel geometry on pulsed flow mixing", *Mechanics Research Communications*, vol. 33, No. 5, Feb. 28, 2006, pp. 739-746.
Zheng et al., "The axial dispersion performance of an oscillatory flow meso-reactor with relevance to continuous flow operation", *Chemical Engineering Science*, vol. 63, No. 7, Dec. 17, 2007, pp. 1788-1799.
Qi et al., "Modelling laminar pulsed flow in rectangular microchannels", *Chemical Engineering Science*, vol. 63, No. 10, Feb. 23, 2008, pp. 2682-2689.

\* cited by examiner

OSCILLATING FLOW MINIREACTOR

This application is the U.S. national phase of International Application No. PCT/EP2011/050386 filed 13 Jan. 2011 which designated the U.S., the entire content of which is hereby incorporated by reference.

The present invention relates to an oscillating flow minireactor which is particularly suited to the handling of suspensions.

Suspensions of solid material in a liquid present a problem when processed because the solid material has a tendency to sediment. If this occurs, the solid will no longer effectively take part in the process being carried out in the reactor.

In order to avoid sedimentation, sufficient mixing energy should be provided to keep the solid material in suspension. In a batch reactor, sedimentation can be reduced by stirring. However, in a continuous tube reactor, typically this is done by creating sufficient turbulence inside the reactor, for example by keeping the flowrate above a so called critical velocity [Yoram Zimmels, Dept of Civil Eng. Technion, Haifa, Israel, Sedimentation, Ullmann Encyclopedia of Ind. Chem., Wiley-VCH, DOI 10.1002/14356007.b02_12.]

The performance of the conventional tube reactor can be improved by applying oscillatory motion to the fluid that flows through the reactor. In U.S. Pat. No. 4,271,007 the formation of solid deposits on the interior walls of a continuous flow reactor presents a problem. Solids are formed by side reaction at points of localized overheating of the (liquid) heavy petroleum reaction stream. This could lead to blocking of the reactor. An oscillating flow is applied through a tubular reactor. This provides good mixing to the reagent flow and reduces the unwanted coke formation on the reactor walls. Accordingly, the system is used to avoid formation of solid material from liquid reagents in the reactor.

Ultrasound is another method which could be used to avoid fouling by formation of solids on reactor walls. In a similar method to ultrasonication used for cleaning laboratory equipment, ultrasound frequencies may be applied to the reactor. Frequencies lower than ultrasound could also be used. US2005/016851A1 and WO02/068112A1 describe such (ultra)sound techniques. However, a disadvantage of this method is that the reactor itself is put into motion. This can damage the connection of reagent and product hoses into the reactor, risking a loss of fluid. At higher frequency the rate of wear, and associated risk, is higher. Further, particularly in the case of large reactors, it means that a high amount of energy is required to move the reactor itself.

U.S. Pat. No. 6,429,268 describes how the combination of stationary annular baffles inside a tube and an oscillatory flow superimposed on a low steady flow creates evenly distributed intense mixing throughout the length of the tube reactor at net low linear liquid velocity. This combination of a steady flow and a superimposed oscillatory flow allow for the decoupling of the transport of fluid from the mixing of the fluid. It becomes possible to have the mixing intensity that corresponds to the turbulent flow regime without the disadvantage of the high linear liquid velocity. This so called continuous oscillatory flow baffled reactor (COBR) can handle processes that require relatively large residence time in short tube length, whereas the use of turbulent flow with high linear velocity in a conventional tube reactor would require an impractical long tube length at equal mixing performance. A further example using a differently shaped baffle in combination with an oscillating flow in a conventional tube reactor is given by US2008/0316858A1. The oscillatory flow mixing reactor comprises a helical baffle disposed within a tubular reactor. The apparatus is suitable for mixing a two-phase reaction stream under low-shear conditions. A theoretical example of crystallization is given.

In the past decades the performance of the conventional continuous tube reactor has been improved by decreasing the diameter to the millimeter and even sub-millimeter domain. This has resulted in a decrease in the transfer distance and at the same time an increase in the volumetric transfer area, which has improved heat and mass transfer capabilities enormously.

A minireactor is typically a reactor having one or more characteristic dimensions in the micrometer to millimeter scale. Thus the term comprises a microreactor (micrometer scale reactor). Descriptions of microreactors may be found, for example, in: V. Hessel and H. Löwe, "Mikroverfahrenstechnik: Komponenten, Anlagen-konzeption, Anwenderakzeptanz", Chem. Ing. Techn. 74, 2002, pages 17-30, 185-207 and 381-400. S. Löbbecke et al., "The Potential of Microreactors for the Synthesis of Energetic Materials", $31^{st}$ Int. Annu. Conf. ICT; Energetic Materials-Analysis, Diagnostics and Testing, 33, 27-30 Jun. 2000, Karlsruhe, Germany. Microreactors, micromixers, micro-heat-exchangers have been developed, for example in Germany (i.e.: IMM, Mainz, and Forschungszentrum Karlsruhe) and in the USA (i.e.: MIT and DuPont).

Minireactors are well-known in the field of chemical process intensification as being suited for highly exothermic reactions. The high surface area to volume ratio of a minireactor permits highly efficient mass and heat transfer and accurate temperature control. The plug-flow mode and the diameter to length ratio allows accurate residence time control.

For flow in a pipe of diameter d, experimental observations show that for 'fully developed' flow, laminar flow occurs when Re<2300 and turbulent flow occurs when Re>4000. In the transition interval between 2300 and 4000, laminar and turbulent flows are both possible, depending on other factors, such as pipe roughness and flow uniformity. J. P Holman *Heat transfer*, McGraw-Hill, 2002.

Reynolds number:

$$Re = \frac{\rho \cdot v \cdot d}{\mu} \quad (1)$$

Re=Reynolds number (non-dimensional)
$\rho$=density (kg/m$^3$)
v=velocity (m/s)
$\mu$=dynamic viscosity (Ns/m$^2$)
d=pipe diameter (m)

Further improvement of heat transfer, mass transfer and residence time control, by entering the turbulent flow regime (Reynolds number, Re>4000), comes at high costs. A problem with minireactors, compared with conventional size tube reactors is that their small cross sectional areas mean that reaching turbulent flow results in an increased pressure drop per unit of channel length. Accordingly, turbulent flow cannot typically be used economically in a minireactor.

As a result most minireactors are operated at relatively low linear flow velocity, i.e. in the laminar flow regime, where heat and mass transfer capabilities largely depend on diffusion over short transfer distance. This design strategy leads to designs with relatively narrow channels to obtain sufficient performance. Although the required technical performance is met, these narrow channel designs result in higher manufacturing costs and increased manifolding challenges when they are scaled-up towards industrial production.

In general minireactors which, by definition, have narrow channel widths are regarded as especially vulnerable to sedimentation, fouling and clogging. [B. Pieters, The impact of microtechnologies on chemical and pharmaceutical production processes, Chem. Eng. Technol., 2007, (30), No. 3, p 407-409] [D. Roberge, Microreactor technology: a revolution for the fine chemical and pharmaceutical industries, Chem. Eng. Technol., 2005, (28), No. 3, p 318-323]

A particular problem with attempting to downscale the above-mentioned baffled tube reactors is the complexity in engineering and manufacturing such a small scale version that would still retain the highly effective heat transfer of a minireactor. For example, if a minireactor having an internal diameter below about 10 mm is required for heat transfer, it is difficult to insert and fix a baffle into a section of tubing of any significant length. Creating a single baffled reactor channel out of many short lengths of reactor tubing and connecting them together would be impractical. Additionally, an industrial minireactor consists of many of such channels in parallel to obtain sufficient reactor volume. Therefore combining the benefits of the COBR reactor with the minireactor is deadlocked by huge technical and economical problems.

Furthermore the insertion of baffle structures into the narrow channel of a minireactor would increase the already existing vulnerability of a minireactor with respect to clogging in the presence of particles.

An object of the present invention is the provision of an apparatus suitable for carrying out processes involving a suspension of solid material in a liquid, on the minireactor scale.

Specifically, the apparatus system should effectively mix a suspension being processed such that solid material does not become deposited in the reactor. A further object of the present invention is that the reactor does not become blocked by solid particles in suspension flowing through the reactor. Still further, the apparatus should be of a simple design and therefore economical to produce.

The present inventors have found ways to overcome the above mentioned problems. Surprisingly sufficient mixing intensity can be created inside a minireactor channel having a small cross sectional area by applying oscillatory flow of the reaction stream in combination with special channel geometry.

Accordingly, the present invention provides an apparatus suitable for carrying out a process on a fluid, said apparatus comprising a) an unbaffled minireactor having a reactor channel defined by a pathway, and b) an oscillating flow device; wherein the microreactor channel pathway comprises one or more directional changes.

A process includes a chemical or physical process involving a transformation. Examples include chemical reaction, extraction, emulsification, dispersing, mixing and crystallization.

As used herein, unbaffled means that the path that the reagent follows through the minireactor is uninterrupted by structures within the reactor channel itself, for example baffles.

As used herein, a minireactor means a micro-, milli or minireactor. Each of these differ only from conventional size reactors in the dimensions and constructions of the reaction channel structures. A minireactor is a miniaturized reactor with characteristic dimensions (channel width and depth, or plate width) of micrometers to millimeters.

The reactor channel pathway is the path traced through the centre of mass of the shape formed by the reactor channel. The reactor channel is the channel through which the fluid flows. Typically a minireactor also contains cooling channels, through which cooling or heating fluid is passed. For the avoidance of doubt these are not considered herein as a reactor channel. One or more cooling channels may surround the reactor channel. For example, in a cross section view of the reactor, a cooling channel may from a concentric circle around the circular reactor channel. In this way a co-current or counter-current coolant flow, with respect to reaction stream net-flow, may be used.

If the suspension is passed around a point of change of direction of the reactor channel pathway several times as the flow of suspension oscillates, the laminar flow is broken up even further.

The reactor channel is characterized by the hydraulic diameter; shape of the channel cross section; curvature of the directional change; and the number of these directional changes per unit of channel length. Each of these parameters allow for careful optimization of the apparatus to the processed fluid system and the desired performance.

The geometry of a single directional change can be defined by three parameters: channel hydraulic diameter, $d_h$; radius of the curve, $R_c$; and angle, $\alpha$; between the channel path through before and after the directional change.

FIGS. 1 to 4 each depict a change of direction in the reactor channel pathway. In each case, $d_h$ is the hydraulic diameter of the channel; $R_c$ is the radius of the curve; and $\alpha$ is the angle between the channel path before and after the directional change.

Figure 2:
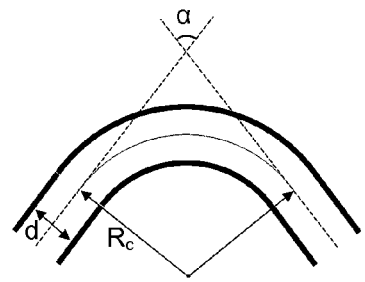
Figure 3:
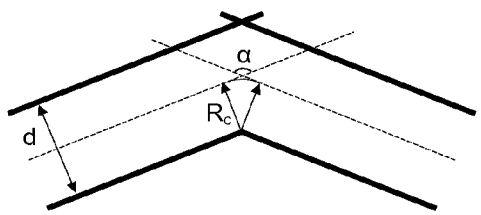
Figure 4:
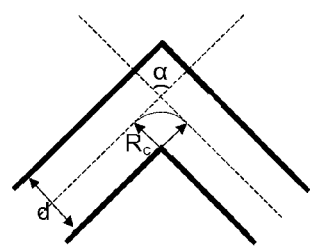

FIG. 1: gentle curve (obtuse $\alpha$);
FIG. 2: tight curve (acute $\alpha$);
FIG. 3, gentle corner (obtuse $\alpha$);
FIG. 4: tight corner (acute $\alpha$).

The directional change, or curvature, along the channel must be such that it forces the fluid to change direction and thereby induces the formation of so called secondary flow [Dean, W. R. (1927) Note on the motion of fluid in a curved pipe. Phil. Mag. 20, 208-223]. The behavior of the secondary flow is characterized by the non-dimensional Dean number:
Dean number:

$$De = Re\left(\frac{d}{2Rc}\right)^{1/2}$$

De=Dean number (non-dimensional)
Re=Reynolds number (non-dimensional)
d=pipe diameter (m)
Rc=radius of curvature (m)

The formation of vortices disrupt the laminar flow pattern and induce transversal transport. Increasing intensity of this secondary flow, characterised by increased Dean number, will lead to engulfment flow and in the end chaotic advective mixing. [Nam-Trung Nguyen, Micromixers: Fundamentals, Design and Fabrication, William Andrew, 2008, ISBN 081551543X, 9780815515432]. This is described for steady flow through micro mixers. However, it has now been found that the intense mixing can also be induced in a minireactor over the total length of a reactor channel by the combination of a plurality of directional changes in the reactor channel pathway and oscillatory flow.

A directional change includes, for example a single bend in an otherwise straight channel. Each directional change induces a disturbance in the flow of the fluid, analogous to a rotation of a stirrer in a batch reactor. The intensity of the disturbance per directional change is determined by the ratio $d_h/R_c$; and the angle $\alpha$.

The directional changes each typically have, a ratio $d_h/R_c$ of from 0.05 to 20. Preferably $d_h/R_c$ is from 0.2 to 10; more preferably 0.5 to 5. The directional changes each typically have angle $\alpha$ of from 0° to 160°. Preferably, it is 20° to 140°; more preferably 40° to 120°.

Further, the number of directional changes, N, per unit of reactor channel pathway length, L, should be within a certain range to obtain the desired performance. A plurality of directional changes may be non-periodic and contain different variations of curvatures. However, for ease of manufacturing a plurality of directional changes is periodic, for example, a waveform. A waveform may be for example, round, sinusoidal, square, triangular, trapezoidal, sawtooth or a combination of two or more of these types.

A ratio N/L is $0.03/d_h$ or above. Typically it is from $0.03/d_h$ to $1/d_h$. Preferably it is from $0.05/d_h$ to $0.5/d_h$. More preferably it is from $0.1/d_h$ to $0.3/d_h$. As described above, $d_h$ is the hydraulic diameter of the reactor channel.

A special case is a spiral shaped reactor pathway. For example, if the minireactor comprises a pipe wound in a spiral, there will be a continuous change of direction of the reactor channel pathway along its length. This can be considered as comprising a number of directional changes approaching infinity. In this case the ratio N/L is above $0.03/d_h$.

A waveform may be two-dimensional or three-dimensional but is preferably two-dimensional. A path traced through the centre of the reactor channel is preferably two-dimensional. A two-dimensional geometry is particularly advantageous because it facilitates construction of the reactor by layering plates of material. This is technically easier to produce and therefore economically advantageous.

The hydraulic diameter $d_h$ for any cross section is defined as 4 A/U, wherein A is the cross sectional area of the reactor channel and U is the wetted perimeter of said cross section. For a round tube, the hydraulic diameter $d_h$ equals the internal diameter of the tube. For a rectangular duct, that has a cross section with a rectangular shape, the hydraulic diameter equals 4 VW/2(V+W), wherein V is the length of the longest side of the rectangle and W is the width of the rectangle. For the special case of a square channel, the hydraulic diameter $d_h$ equals V. For an annulus, the hydraulic diameter is $d_h=(4*0.25\pi(d_o^2-d_i^2))/\pi(d_o-d_i)=d_o-d_i$, wherein $d_o$ is the outer diameter of the annulus and $d_i$ is the inner diameter.

The reactor channel typically has a hydraulic diameter of from 0.01 to 10 mm. If the hydraulic diameter is smaller than 0.01 mm, there is a risk of blocking when processing many suspensions. If the hydraulic diameter is larger than 10 mm, sufficient turbulence becomes a problem. Typically the hydraulic diameter is from 0.1 to 10 mm. Preferably it is from 0.2 mm to 8 mm; more preferably from 0.4 mm to 6 mm; still more preferably from 0.6 mm to 4 mm; most preferably from 1 mm to 3 mm. Further examples include 0.02 mm to 6 mm; from 0.4 mm to 4 mm; from 0.5 mm to 3 mm, for example 1 mm or 2 mm.

The hydraulic diameter may vary along the length of the reactor channel. However, preferably the reactor channel has a constant hydraulic diameter. More preferably the reactor channel has a constant cross-section. By constant, it is meant constant along the portion of the reactor channel in which the process occurs; preferably along the entire length of the reactor channel.

Having a constant cross sectional area means that there are no baffles or insertions inside the reactor channel, thereby avoiding the engineering and manufacturing difficulties mentioned above.

Various shapes of the cross section are possible: round, oval, semi-circular, square, rectangular, triangular, irregular. For each shape it is possible to find an optimum flow-oscillation and fluid velocity to generate the desired mixing performance. For ease of manufacture simple geometries are preferred.

The apparatus of the present invention is capable of carrying out processes involving a suspension of solid material in a liquid or in a gas/liquid mixture. Due to the absence of internal structures in the reactor channel, the relatively large cross sectional area permitted by using oscillating flow, and the intense and equal distributed mixing over the channel length, the sedimentation of solids can be prevented. Even already deposited particles can be redispersed, thereby reversing sedimentation.

A constant hydraulic diameter and, to a greater extent, a constant cross-section, reduces the amount of internal pressure variations and other localized reductions in suspension flow, which might lead to sedimentation of solid material inside the reactor. The likelihood of solid particles being deposited inside the reactor is therefore reduced when a constant hydraulic diameter and/or a constant cross-section are used. More preferably the inside surface of the minireactor is smooth. A smooth surface reduces the likelihood of solid particles being deposited on the inside of the reactor. The surface roughness $R_a$ is measured as the arithmetic average of the absolute values of the vertical deviations. The ratio $R_a$ to channel diameter should be at least 1:500.

To prevent clogging, the size of particle that may be carried in suspension in the apparatus of the present invention is typically up to one third of the hydraulic diameter of the reactor channel. Here particle size means the longest dimension of the particle. Preferably the particle size is from 1 nm to 1 mm. More preferably it is from 5 μm to 100 μm; still more preferably from 10 μm to 50 μm. In any case the particle size should not exceed one third of the hydraulic diameter of the reactor channel. Preferably it should not exceed one fifth of the hydraulic diameter of the reactor channel.

Although particularly useful for the handling of dispersions, the apparatus may also be used to process fluids which are not solid-in-liquid suspensions, for example homogeneous liquids, liquid-liquid emulsions and gas-liquid dispersions. The apparatus of the present invention shows improved performance in heat and/or mass transfer with respect to conventional minireactors with equal characteristic dimensions. The apparatus allows for easier scale-up and lower manufacturing costs. These advantages apply to the above fluids, as well as to solid-in-liquid suspensions.

Typically, the minireactor comprises a laminate structure. By a laminate structure is meant at least two layers of sheets of material. A preferred laminate arrangement of sheets is of alternating channel containing and non channel containing sheets. Typically a sheet with a channel formed in it is arranged adjacent to a sheet such that the channel is closed around its cross sectional perimeter. For example a U-shaped cross section channel is closed to form an approximately O-shaped cross section channel.

Typically a minireactor also comprises a cooling channel, through which a coolant is circulated. Heat transfer into the coolant may also be increased by causing oscillating flow in the coolant. Accordingly, the apparatus of the present invention may comprise a second oscillating flow device. However in one embodiment, the oscillating flow device is connected to the reactor channel and to at least one cooling channel within the minireactor.

The present invention also provides a method of making an apparatus as described above, comprising:
i) forming a channel in a sheet of material;
ii) stacking one or more of said sheets with one or more different sheets of material to form a laminated minireactor; and
iii) connecting said device to an oscillating flow device.

Typically, a path through the centre of the channel in the first sheet of material is two-dimensional.

Preferred construction materials for the minireactor are: metal, glass, silicon, ceramics, polymers. Typically, a channel is formed by a manufacturing technique suitable for the chosen construction material, for example as described in: Microreactors in organic synthesis and catalysis, Dr. T. Wirth, p 1-41, Wiley-VCH, 2008, ISBN 978-3-527-31869-8.

Stacked sheets are fixed together by standard means known in the art. For example, metal sheets may be fixed by clamping or diffusion bonding.

In addition to forming the reaction channel, cooling channels may also be provided, either in the same operation or separately by the same or a different technique.

The flow through the reactor channel can be considered as a constant (stationary) flow in forward direction for liquid transport with a superimposed oscillating flow for mixing enhancement. The combination of the stationary flow and oscillating flow give a net flow. The stationary flow is typically provided by a pump. Suitable pumps are known in the art.

The oscillating flow is characterized by the waveform, frequency, and the amplitude of the fluid velocity as function of time. For a given channel dimension and geometry these parameters allow for careful optimization to the processed fluid system and the desired performance. "Flow" in the term "oscillating flow" refers to the flow of the fluid in the minireactor.

The oscillating flow can be described as the variation in the mean liquid velocity as function of time due to the movement of the oscillating flow device attached to the minireactor. The mean liquid velocity will show a certain waveform in a time plot. This waveform may have different shapes.

An oscillating flow device is a device that periodically interrupts the flow of the reaction stream through the reactor. The net flow of the reaction stream is in the forward direction but the oscillating flow device slows, pauses and/or reverses this forward flow periodically. Such oscillating flow provides turbulence and therefore mixing to the reaction stream. Typical oscillating flow devices are (optionally modified) pumps.

Oscillating flow devices are known in the prior art. For example, pulsed extraction columns [A. Pfennig, RWTH Aachen University, Germany, Liquid-liquid extraction, Ullmann Encyclopedia of Ind. Chem., Wiley-VCH, (2005), DOI 10.1002/14356007.b03_06.] or oscillating flow baffled reactors [U.S. Pat. No. 6,429,268, X. Ni, mixing through oscillations and pulsations—a guide to achieving process enhancements in the chemical and process industries, Transc IChemE, Vol 81, Part A, March 2003, p 373-383]. In most cases modified piston pumps or diaphragm pumps are used as the pulsators. Modification may be for example that the checkvalves of such pumps are removed.

In a preferred embodiment the oscillating flow device also provides the stationary flow. In this case, only one pump is present.

The frequency of the flow oscillation may vary depending on the channel dimensions, and geometry, typically from 0.1 Hz to 1000 Hz. A preferred frequency is from 0.5 to 500 Hz; more preferably from 1 to 100 Hz; for example from 2 to 40 Hz.

The amplitude of the oscillating flow may vary depending on the channel dimensions and geometry. The ratio between stationary flow to amplitude of oscillating flow ($F_s/F_o$) may vary from 0.05 to 1000.

The oscillating flow device is typically fluidically connected to the minireactor by techniques known in the art, for example by hosing or tubing, as described in the references above.

The stationary flow is chosen in such way that the desired Reynolds number is obtained for the given channel geometry and fluid properties.

Reynolds numbers, Re, of from 1 and 10,000 are sought in the apparatus of the present invention. Preferably the Reynolds number is between 10 and 4000, more preferably from 50 to 2000, still more preferably from 100 to 1000. Power loss between an inlet and an outlet of the minireactor is dependent on Re. Accordingly an increase in power loss is indicative of an increase in Re. Power loss can be measured by a pressure gauge at each of the inlet and outlet of the mixing minireactor.

The handling of large volumes of reagents is effected by running many reactors in parallel. Such a structure of parallel flow minireactors may be termed a ministructure reactor. Where more than one minireactor is connected in parallel, the oscillating flow device is typically connected to a manifold, which then distributes the reaction stream to the parallel minireactors.

In one embodiment the present invention provides use of an apparatus as described above to carry out a process on a suspension. A preferred process is a reaction involving a solid reagent, solid product or solid catalyst, or the process is a crystallization or precipitation.

Because the energy requirement for mixing is only partly generated from the stationary flow of the suspension through the reactor, low stationary flows can be chosen. This allows for having longer residence time in the reactor compared to a conventional minireactor of the same volume. This is especially useful in processes such as crystallization which often demand a slow cooling, therefore a relatively long residence time. The oscillating device also provides a further means of controlling the residence time and its distribution, for example by adjusting the frequency, and amplitude of oscillation.

Figure 5:
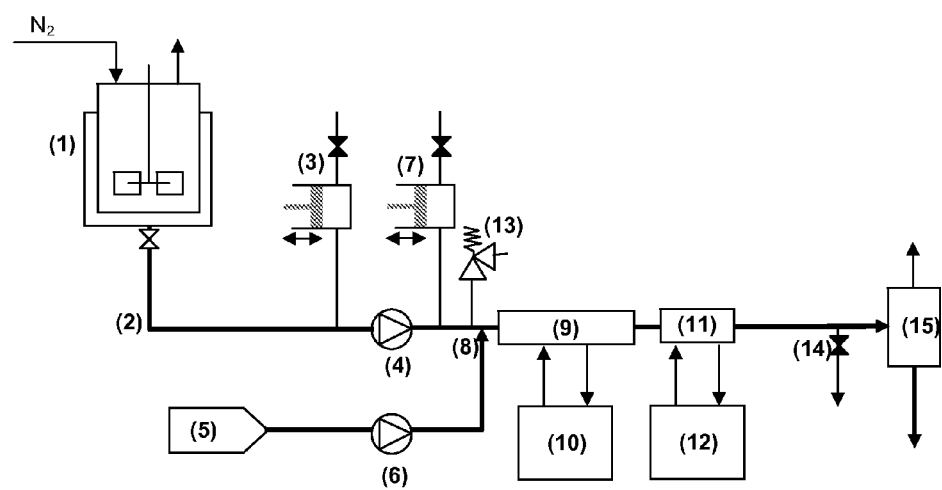

FIG. 5 illustrates an experimental set-up of the present invention. This set-up was used in Examples 3 to 5. Zinc powder and solvent are dosed to the slurry vessel (1) and mixed to form a slurry of particles. The slurry is pumped through the zinc feed line (2) by the feed pump (4) to the oscillating flow mini reactor (9). Pulsators (3) and (7) apply the oscillating flow to the zinc feed line and the oscillating flow mini reactor. The feed pump supplies the stationary flow and pulsator (7) supplies the oscillatory flow which is superimposed to enhance mixing in the mini reactor. Substrates (5) that react with the zinc particles are fed to a T-junction (8) by pump (6). The substrates react with the zinc particles inside the mini reactor (9). The reaction temperature in the minireactor is controlled by thermostat (10). After the reactive part, a subsequent minireactor (11) is used to cool the reaction mixture with a second thermostat (12). The system is protected against overpressure by pressure relief valve (13). Samples can be taken at sample point (14). The reaction mixture is collected in vessel (15) which has a vent to an off gas system.

Figure 6:
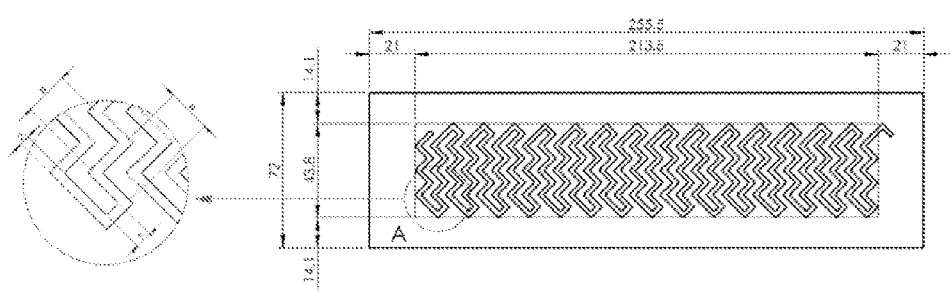

FIG. 6 illustrates the geometry of a minireactor having a channel diameter of 2.0 mm and a total length of 1.71 m. The reactor volume is approximately 6.84 ml and its structure consists of 30 repetitive zig-zag units.

The present invention is illustrated by, but not limited to, the following examples.

EXAMPLES

Example 1

To 1 kg of a saturated solution of sodiumbicarbonate in water at room temperature, 100 g sodiumbicarbonate crystals were added. The crystals had a particle size distribution of 80-270 microns. The resulting slurry was stirred in a tank reactor and pumped at a steady flowrate of 10 ml/min through the minireactor. The channel in the minireactor had a 5 mm×5 mm square cross section with a 6.25 mm hydraulic diameter $d_h$. The channel had a 90° ($\alpha$) bend every 20 mm of channel length (N/L=50/m). Each 90° bend had a curvature of 2.5 ($d_h/R_c$). A pulsator was connected to the feedline of the minireactor. The pulsator was operated with a sinusoidal shaped waveform. By varying the frequency and the amplitude of the oscillating flow conditions were found where the solid particles deposited a sediment in the minireactor channel. Other conditions were found where the induced mixing was capable of keeping the particles in suspension. Further, it was possible to resuspend particles that had already deposited as a sediment. Results are shown in Table 1.

TABLE 1

| Oscillator | | |
|---|---|---|
| Frequency (Hz) | Amplitude (ml) | Observed deposition |
| 3 | 0.8 | No |
| 0 | 0 | Yes |
| 2 | 0.7 | No |
| 0.1 | 0.4 | Yes |
| 1.5 | 0.5 | No |

Example 2

Example 1 was repeated under the same conditions except that the slurry was pumped at a steady flowrate of 34 ml/min through minireactor.

By varying the frequency and the amplitude of the oscillating flow conditions where the solid particles deposited a sediment in the minireactor channel. Other conditions were found where the induced mixing was capable of keeping the particles in suspension. Further, it was possible to resuspend particles that had already deposited as a sediment. Results are shown in Table 2.

TABLE 2

| Oscillator | | |
|---|---|---|
| Frequency (Hz) | Amplitude (ml) | Observed deposition |
| 3 | 1 | no |
| 0 | 0 | yes |
| 2 | 1 | no |
| 0.2 | 0.6 | yes |

Example 3

Synthesis of Silyl Ethers Using Oscillating Flow Reactor

The following reaction was carried out:

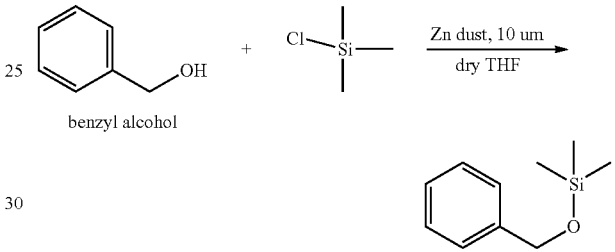

The oscillating flow reactor set up according to FIG. 5. This was first completely dried and was then was flushed for 20 min with anhydrous THF to make sure that entire set-up contained dry THF only. Zinc slurry (10 m %/vol THF) was prepared in a 1.5 liter continuously stirred tank reactor (CSTR) equipped with 3 baffles, and the stirrer set at around 400 rpm. The zinc was completely suspended in the CSTR. A substrate feed containing a mixture of both the substrates (benzyl alcohol and trimethylsilylchloride (TMS-Cl)) was prepared with the molar ratio of 1.2 and was kept under nitrogen during the whole experimental run. The reactor was a spiral stainless steel SS 316 tube with internal diameter of 2 mm, curvature dh/Rc of 0.13, and the reactor volume was 23 ml.

The flows as mentioned in the table below were started and were allowed to run for 15 mins after which a sample was taken, filtered and analyzed by GC. The main oscillating flow was 2 Hz; with a stroke volume of 1.2 ml. The feed oscillating flow was 1.75 Hz; with a stroke volume of 0.35 ml. No sedimentation occurred. Results are shown in Table 3.

TABLE 3

| Expt. No. | Slurry flow (ml/min) | Substrate flow ml/min | Temp. ° C. | Res. Time min. | Benzyl alcohol Conversion % | Mol ratio Zn/ Benzyl-Alcohol |
|---|---|---|---|---|---|---|
| 3.1 | 8.6 | 1.5 | 25 | 2.3 | 75 | 1.17 |
| 3.2 | 8.6 | 1.5 | 15 | 2.3 | 77 | 1.17 |
| 3.3 | 8.6 | 0.75 | 15 | 2.45 | 80 | 2.3 |

Example 4

Synthesis of Grignard Reagents Using Oscillating Flow Reactor

The following reaction was carried out:

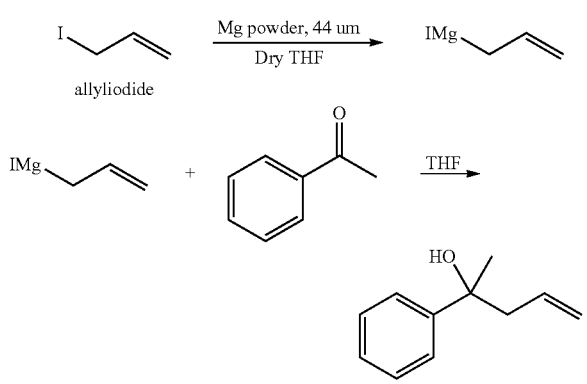

The oscillating flow reactor set up according to FIG. 5. This was first completely dried and was then was flushed for 20 min with anhydrous THF to make sure that entire set-up contained dry THF only. Magnesium slurry (10 m %/vol THF) was prepared in a 1.5 liter continuously stirred tank reactor (CSTR) equipped with 3 baffles, and the stirrer set at around 400 rpm. The magnesium was completely suspended in the CSTR. Pure allyl iodide feed was kept under nitrogen during the whole experimental run. The reactor was a spiral stainless steel SS 316 tube with internal diameter of 2 mm, curvature dh/Rc of 0.13, and the reactor volume was 23 ml.

The flows as mentioned in the table below were started and were allowed to run for 15 mins after which a sample was collected in a known amount of the acetophenone in THF and was allowed to reaction with the formed Grignard reagent for 30 min. The sample was then analysed by GC. The main oscillating flow was 2 Hz; with a stroke volume of 1.2 ml. The feed oscillating flow was 1.75 Hz; with a stroke volume of 0.35 ml. No sedimentation occurred. Results are shown in Table 4.

TABLE 4

| Expt. No. | Slurry flow (ml/min) | Substrate flow ml/min | Temp. °C. | Res. Time min. | Product Yield % | Acetophenone Conversion % | Mol ratio Mg/Allyliodide |
|---|---|---|---|---|---|---|---|
| 4.1 | 8.6 | 1.5 | 25 | 2.3 | 43 | 60 | 3.2 |
| 4.2 | 8.6 | 1.5 | 40 | 2.3 | 56 | 74 | 3.2 |
| 4.3 | 8.6 | 0.75 | 50 | 2.3 | 68 | 82 | 3.2 |
| 4.4 | 5.5 | 0.75 | 50 | 3.7 | 72 | 86 | 4.2 |

Example 5

TCCA Oxidation Using Oscillating Flow Reactor
The following reaction was carried out:

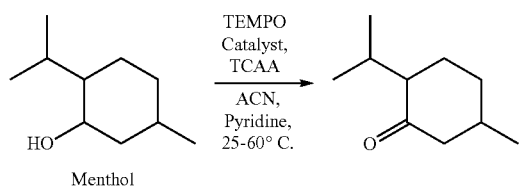

Two solutions were prepared:
Solution A: Menthol (7.8 g, 50.0 mmol), TEMPO (76 mg; 0.5 mmol) and pyridine (4 mL; 50 mmol) were dissolved in acetonitrile (50 mL).
Solution B: TCCA (trichloroisocyanuric acid, 4.1 g; 17.5 mmol) in acetonitrile (50 mL).

The oscillating flow reactor set up according to FIG. 5. This was first completely dried and was then was flushed for 20 min with anhydrous THF to make sure that entire set-up contained dry THF only.

Solutions A and B were pumped at the desired flow rates; mixed at a t-piece and allowed to react in a spiral stainless steel tubing reactor with internal diameter of 2 mm, curvature dh/Rc of 0.13, and reactor volume of 23 ml. The main oscillating flow was 2 Hz; with a stroke volume of 1.2 ml. The feed oscillating flow was 1.75 Hz; with a stroke volume of 0.35 ml.

The residence times were from 1 to 5 minutes and the temperature was in the range of 25-55° C. During the reaction white solids from the reaction mixture crystallizes out. These solids are kept in the suspension using oscillating flow. The sample collected was filtered and analyzed by GC. No sedimentation occurred. Results are shown in Table 5.

татLE 5

| Expt. No. | Solution A flow (ml/min) | Solution B flow ml/min | Temp. °C. | Res. Time min. | Product Yield % |
|---|---|---|---|---|---|
| 5.1 | 5 | 5 | 25 | 2.3 | 59 |
| 5.2 | 5 | 5 | 40 | 2.3 | 78 |
| 5.3 | 5 | 5 | 50 | 2.3 | 88 |

Example 6

Slurry of Silica in Water
Equipment:

A ministructured reactor having a channel diameter of 2.0 mm and a total length of 1.71 m was used. The reactor volume is approximately 6.84 ml and its structure consists of 30 repetitive zig-zag units. The reactor is made out of 316 stainless steel with the cover made out of poly-carbonate (Lexane).

The used gasket is Teon-based (Novaon 500). The geometry of the reactor is illustrated in FIG. 6.

A SERA RS 1.8, electromagnetic membrane pump was used as an oscillating flow device during the study. It has a maximum stroke volume of 0.5 ml, the minimum is 0.35 ml. The membrane is electromagnetically driven, and is made out of PTFE. It has a maximum working pressure of 10 bars. The maximum achievable stroke speed is 150 min$^{-1}$. The maximum allowable temperature is 80° C.

A Hitec Zang LabDos P100™, tube pump was used as a slurry feed pump during the study. It has a maximum working pressure of 2.5 bars, according to specifications.

The flow range is 0-100 ml/min (0.01-170 rpm). The maximum usable wall thickness of the tube wall is 1.6 mm and the maximum usable internal diameter is 4.0 mm. Calibration is performed using an ordinary rubber tube, 3.0 mm internal diameter and 1.5 mm wall thickness.

Procedure:

A 250 ml continuously stirred tank reactor (CSTR) fitted with a 6 bladed turbine, head stirrer and a singular baffle was filled with 160 grams of degassed demineralized water. The stirrer speed was set on the appropriate rpm. Before use the system was cleaned and dried. The feed pump (Hitec Zang LabDos™ in combination with an ordinary rubber tube, 3.0 mm internal diameter and 1.5 mm wall thickness) was set on a flow of 8.7 ml/min (20 rpm).

When the system was filled and all gas bubbles which were present inside the reactor system were removed the oscillating pump was turned on (SERA Electromagnetic Membrane pump RS 1.8) at 75 bpm and 0.5 ml stroke volume (50%). Before every addition of fines the feed flow was shutdown temporarily, to prevent instant blocking in the CSTR outlet tubing. When the appropriate amount of fines was added the reactor was left for another 30 seconds (to get a complete uniform suspension again) before restarting the feed pump.

The system was set-up with a low concentration slurry which was fed to the reactor at a low feed flow in combination with the superimposed oscillating flow.

At random intervals more fines (SiO2) were added to increase the slurry concentration. This was repeated until the reactor blocked. Results are shown in Table 6.

TABLE 6

| Distribution (μm) | Stirrer speed (rpm) | Feed (ml/min) | Run Time (min) | Remark | Concentration (m/m %) |
|---|---|---|---|---|---|
| 63-100 | 350 | 4.4 | 35 | Stable | 33.3 |
| 63-100 | 350 | 4.4 | * | Blocked | 36.0 |
| 63-200 | 193 | 4.4 | 44 | Stable | 30.4 |
| 63-200 | 193 | 4.4 | * | Blocked | 33.3 |
| 200-500 | 191 | 4.4 | 14 | Stable | 7.5 |
| 200-500 | 191 | 4.4 | * | Blocked | 11.1 |

Oscillating flow settings were similar for all experiments, viz. 75 bpm and 0.5 ml.
* No figure available.

Example 7

Slurry of Silica in Water

The procedure of Example 6 was repeated. The reactor set-up of Example 6 was again used. Results are shown in Table 7.

TABLE 7

| Run # | Distribution (μm) | Concentration (m/m %) | Flow (ml/min) | OF (bpm) | OF (ml) | Re | $Re_p$ | $V_t$ (m/s) | $V_{flow}$ (m/s) | Run Time (min) | Remark |
|---|---|---|---|---|---|---|---|---|---|---|---|
| 1.1 | 63-100 | 5.9 | 4.4 | 0 | 0 | 41.19 | 1.82 | 0.0146 | 0.0183 | * | No movement |
| 1.2 | 63-100 | 5.9 | 8.7 | 0 | 0 | 81.45 | 3.61 | 0.0174 | 0.0362 | * | No movement |
| 1.3 | 63-100 | 5.9 | 13.1 | 0 | 0 | 122.6 | 5.43 | 0.0192 | 0.0545 | 74 | Slight movement |
| 1.4 | 63-100 | 5.9 | 17.4 | 0 | 0 | 162.9 | 7.21 | 0.0207 | 0.0724 | 93 | Stable |
| 1.5 | 63-100 | 5.9 | 21.8 | 0 | 0 | 204.1 | 9.04 | 0.0219 | 0.0908 | 76 | Stable |
| 1.6 | 63-100 | 5.9 | 4.4 | 30 | 0.5 | 181.6 | 8.04 | 0.0212 | 0.0807 | 121 | Stable |
| 2.1 | 63-100 | 30.4 | 8.7 | 75 | 0.5 | 432.5 | 19.2 | 0.0264 | 0.1923 | 28 | Stable |
| 2.2 | 63-100 | 30.4 | 8.7 | 0 | 0 | 81.44 | 3.61 | 0.0174 | 0.0362 | 60 | Stable |
| 2.3 | 63-100 | 30.4 | 4.4 | 75 | 0.5 | 392.3 | 17.4 | 0.0257 | 0.1744 | 34 | Stable |
| 2.4 | 63-100 | 30.4 | 4.4 | 0 | 0 | 41.19 | 1.82 | 0.0146 | 0.0183 | 60 | Stable |
| 3.1 | 200-500 | 5.9 | 4.4 | 0 | 0 | 41.19 | 9.12 | 0.0490 | 0.0183 | * | Blocked |
| 3.2 | 200-500 | 5.9 | 4.4 | 75 | 0.5 | 392.3 | 86.9 | 0.0860 | 0.1744 | 15 | Stable |
| 3.3 | 200-500 | 5.9 | 8.7 | 30 | 0.44 | 205.0 | 45.4 | 0.0732 | 0.0912 | 28 | Stable |
| 3.4 | 200-500 | 5.9 | 4.4 | 30 | 0.44 | 164.8 | 36.5 | 0.0693 | 0.0733 | 33 | Stable |

* No figure available.
Run series 1 and 3 were conducted using a 5.9 m/m % slurry
Run series 2 was conducted using a 30.4 m/m % slurry It was observed that the net flow was not significant for maintaining the fines in stable suspension when oscillating flow is applied, since deposition was not observed even at a net flow approaching zero. It was also observed that at a higher concentration of fines, the suspension becomes more stable. This is due to hindered settling of the fines.

Example 8

Crystallisation of Oxalic Acid and Potassium Nitrate

Equipment:

The reactor was constructed from a 10 m long LD-PE tube (4.0 mm internal diameter, 6.0 mm external diameter) in which 10 m of PTFE tubing was inserted (2.54 mm internal diameter, 3.18 mm external diameter) and has a working volume of about 50 ml. The continual changes of direction were made in a helical fashion with an inner diameter of the helix of 1.9 cm. The outer LD-PE tube is used as insulation to decrease heat loss to the surroundings during operation. The outer tube is filled with water, but in case of a blockage warm water could be pumped through it to help remove the crystals. The inner tube is used for the crystallization.

The tubing is wound around a PVC pipe through which also warm water could be pumped in the event of blockage.

An ORLITA MfS 18/20, double diaphragm hyd. pump (ProMinent Verder B. V.) was used as an oscillator during the study. The piston diameter is 20 mm and the maximum stroke length is also 20 mm, at 20 mm stroke length the stroke volume is 6.28 ml. The diaphragm is made out of PTFE and has a working pressure of 50 bars.

A 500 ml ask was used in combination with a hot plate stirrer for main-taining the solute at the desired temperature. The solute was pumped from the flask into the setup using the Hitec Zang LabDos™ tube pump. The pump outlet was connected with the minireactor and the diaphragm pump through a T-piece.

Procedure:

A solution of 141.0 g of oxalic acid (98% CAS 144-62-7, Sigma-Aldrich Co. Ltd.) in 700 ml tap water was heated and kept at 90° C. until use, the crystallization point of this solution is 40° C. After pre-heating the reactor the solute was added to the flask and pumped into the minireactor. Inside the reactor the solution was cooled (due to convection from the tubing to the surroundings) to a temperature of 20° C. to 21° C. The product, an oxalic acid dihydrate in water suspension, was then collected and filtrated at the same time. The crystals were dried in vacuo for more than 30 minutes. The dry crystals were than weighed, and photographed using a camera equipped microscope to measure the particle size.

The experiment was repeated but using 291.4 g potassium nitrate (94% CAS 7757-79-1, E. Merck, Darmstadt) dissolved in 502 g of water, in place of oxalic acid in water. Potassium nitrate has a crystallization point of approximately 34° C.

Pump settings and results are shown in Table 8.

TABLE 8

| | | Exp. | | |
|---|---|---|---|---|
| Product | | 1 Oxalic acid | 2 Oxalic acid | 3 KNO3 |
| OF | (bpm) | 210 | 210 | 210 |
| OF | (mm) | 6.7 | 6.7 | 6.7 |
| Feed | (ml/min) | 8.7 | 7.8-9.6 | 6.7-8.7 |
| $T_{solute}$ | (° C.) | 90 | 90 | 100 |
| $T_{start}$ | (° C.) | 41 | 47 | 53 |
| $T_{end}$ | (° C.) | * | 24 | 27 |
| Blocked | (Yes/No) | Yes | No | No |
| Duration | (min) | — | 35 | 93 |

* No figure available.

Example 9

Crystallisation of Oxalic Acid

Example 8 was repeated with 141.0 g of oxalic acid in 700 ml tap water. The results are given in Table 9.

TABLE 9

| Run | # | 1 | 2 | 3 | 3.1 | 4 | 5 | 6 |
|---|---|---|---|---|---|---|---|---|
| OF | (bpm) | 100 | 110 | 250 | 250 | 300 | 60 | 60 |
| OF | (mm) | 3.0 | 3.0 | 2.0 | 2.0 | 2.2 | 3.0 | 2.5 |
| OF displacement | (ml/min) | * | 83.6 | 60.0 | 60.0 | 72.0 | 61.2 | 45.6 |
| Feed | (ml/min) | 6.5-7.0 | 7.8 | 8.7 | 8.7 | 8.7 | 8.7 | 8.7 |
| Tstart | (° C.) | 46 | 46 | * | * | 49 | 52 | 50 |

TABLE 9-continued

| Run | # | 1 | 2 | 3 | 3.1 | 4 | 5 | 6 |
|---|---|---|---|---|---|---|---|---|
| Tend | (° C.) | 28 | 21 | * | * | * | * | 21 |
| Run-time | (min) | 15 | 90 | 25 | 25 | 20 | <5 | <5 |
| Sample taken | | Late | Early | Early | Late | Early | Early | Early |
| Blocked | (Yes/No) | Yes | No | Yes | Yes | Yes | Yes | Yes |
| Particle size** | | 0.7 | 0.4 | 0.4 | 1.2 | 1.0 | 1.1 | 0.6 | 0.5 |

* No FIG. available.
**Approximate longest length of particle observed (mm)

The invention claimed is:

1. An apparatus suitable for carrying out a process on a fluid, said apparatus comprising a) an unbaffled minireactor having a reactor channel defined by a pathway, and b) an oscillating flow device; wherein the reactor channel pathway comprises one or more directional changes; and wherein the net flow of the reaction stream is in the forward direction but the oscillating flow device slows, pauses and/or reverses this forward flow periodically; and wherein the frequency of the flow oscillation may vary from 0.1 Hz to 1000 Hz and the ratio between stationary flow to amplitude of oscillating flow may vary from 0.05 to 1000.

2. An apparatus according to claim 1, wherein the reactor channel has a hydraulic diameter of from 0.01 mm to 10 mm.

3. An apparatus according to claim 1, wherein the reactor channel has a constant hydraulic diameter.

4. An apparatus according to claim 1, wherein each directional change has a ratio of hydraulic diameter, $d_h$, to radius of curve, $R_c$, of from 0.5 to 5.

5. An apparatus according to claim 1, wherein each directional change has an angle of curve, a, of from 40° to 120°.

6. An apparatus according to claim 1, wherein the ratio of the number of directional changes, N, to the length of the reactor channel pathway, L, is from $0.03/d_h$ to $1/d_h$, where $d_h$ is the hydraulic diameter of the reactor channel pathway.

7. An apparatus according to claim 1, wherein the reactor channel has a constant cross-section.

8. An apparatus according to claim 1 in which the reactor channel pathway is two dimensional.

9. An apparatus according to claim 1, wherein the minireactor comprises a laminate structure.

10. An apparatus according to claim 1, wherein the oscillating flow device is connected to the reactor channel and to at least one coolant channel within the minireactor.

11. A method of making an apparatus as defined in claim 1 comprising:
   i) forming a channel in a sheet of material;
   ii) stacking one or more of said sheets with one or more different sheets of material to form a laminated minireactor; and
   iii) connecting said device to an oscillating flow device.

* * * * *

UNITED STATES PATENT AND TRADEMARK OFFICE
CERTIFICATE OF CORRECTION

PATENT NO. : 10,118,149 B2
APPLICATION NO. : 13/979719
DATED : November 6, 2018
INVENTOR(S) : Reintjens et al.

Page 1 of 1

It is certified that error appears in the above-identified patent and that said Letters Patent is hereby corrected as shown below:

In the Specification

At Column 14/Line 65: "ask" should read --flask--

Signed and Sealed this
Sixteenth Day of July, 2019

Andrei Iancu
*Director of the United States Patent and Trademark Office*